United States Patent
Engels

(10) Patent No.: US 10,907,939 B2
(45) Date of Patent: Feb. 2, 2021

(54) VIEWING INSTRUMENT HAVING WAVEGUIDE IMAGE TRANSMISSION AND ROTATABLE RETICLE

(71) Applicant: Nedinsco B.V., Venlo (NL)

(72) Inventor: Marie Martinus Johannes Cornelis Engels, Reuver (NL)

(73) Assignee: Nedinsco B.V., Venlo (NL)

( * ) Notice: Subject to any disclaimer, the term of this patent is extended or adjusted under 35 U.S.C. 154(b) by 0 days.

(21) Appl. No.: 16/743,416

(22) Filed: Jan. 15, 2020

(65) Prior Publication Data
US 2020/0225007 A1    Jul. 16, 2020

(30) Foreign Application Priority Data

Jan. 15, 2019 (DE) ...................... 10 2019 100 920

(51) Int. Cl.
| | |
|---|---|
| *F41H 5/26* | (2006.01) |
| *G01C 9/02* | (2006.01) |
| *G02B 23/00* | (2006.01) |
| *G02B 6/06* | (2006.01) |
| *F41H 7/02* | (2006.01) |

(52) U.S. Cl.
CPC ............... *F41H 5/266* (2013.01); *G01C 9/02* (2013.01); *G02B 6/06* (2013.01); *G02B 23/00* (2013.01); *F41H 7/02* (2013.01)

(58) Field of Classification Search
CPC .. F41H 5/266; F41H 7/02; G01C 9/02; G02B 23/00; G02B 6/06; F41G 3/14; F41G 1/46
See application file for complete search history.

(56) References Cited

U.S. PATENT DOCUMENTS

| | | | | |
|---|---|---|---|---|
| 4,434,702 A | * | 3/1984 | Rozner | F41H 5/266 359/406 |
| 4,577,546 A | * | 3/1986 | Jackson | F41H 5/266 89/203 |
| 4,669,833 A | * | 6/1987 | Mise | G02B 23/16 359/420 |
| 5,054,225 A | | 10/1991 | Giuffre et al. | |
| 5,060,554 A | * | 10/1991 | Aharon | F41H 5/266 89/41.19 |
| 5,103,713 A | | 4/1992 | Loving | |
| (Continued) | | | | |

FOREIGN PATENT DOCUMENTS

| | | |
|---|---|---|
| DE | 10253477 A1 | 4/2004 |
| EP | 1467237 A1 | 10/2004 |

*Primary Examiner* — Andrew Jordan
(74) *Attorney, Agent, or Firm* — Adams and Reese, LLP

(57) ABSTRACT

The invention relates to a viewing instrument (1) for observing the surroundings and aiming at targets in the surroundings of a vehicle, in particular an armored vehicle, comprising an eyepiece unit (2) and an objective unit (3) and comprising an optical waveguide bundle (4), which connects the objective unit (3) and the eyepiece unit (2) to each other, wherein the optical waveguide bundle (4) transmits an image of the surroundings, which is focused by the optical unit of the objective unit (3) onto the objective-side end of the optical waveguide bundle (4), to the eyepiece unit (2), wherein a reticle (6) is arranged in an intermediate image plane, in which the optical unit (5) of the eyepiece unit (2) focuses the transmitted image of the surroundings as an intermediate image, and is rotatable about the optical axis (7) relative to the intermediate image.

8 Claims, 4 Drawing Sheets

(56) References Cited

U.S. PATENT DOCUMENTS

| | | | | |
|---|---|---|---|---|
| 5,874,726 A * | 2/1999 | Haydon | ............ | G02B 21/0072 |
| | | | | 250/201.1 |
| 8,004,690 B2 * | 8/2011 | Wegmann | ........... | G03F 7/70483 |
| | | | | 356/521 |
| 9,482,488 B2 * | 11/2016 | Moyle | .................. | G02B 6/0008 |
| 10,072,907 B2 * | 9/2018 | Hofmann | .................. | F41G 3/02 |
| 10,642,038 B1 * | 5/2020 | Schuyler | ............ | G02B 27/0093 |
| 10,775,134 B2 * | 9/2020 | Hofmann | .................. | F41G 3/06 |
| 2009/0116036 A1 * | 5/2009 | Wegmann | ........... | G03F 7/70483 |
| | | | | 356/521 |
| 2011/0271576 A1 | 11/2011 | Jahromi | | |
| 2015/0198416 A1 * | 7/2015 | Moyle | .................... | G02B 23/00 |
| | | | | 359/428 |
| 2016/0138890 A1 * | 5/2016 | Hofmann | ............... | G02B 27/36 |
| | | | | 345/59 |
| 2018/0364005 A1 * | 12/2018 | Hofmann | ............... | G02B 23/14 |
| 2020/0225006 A1 * | 7/2020 | Engels | .................. | G02B 23/08 |
| 2020/0225007 A1 * | 7/2020 | Engels | ..................... | F41G 3/14 |

\* cited by examiner

VIEWING INSTRUMENT HAVING WAVEGUIDE IMAGE TRANSMISSION AND ROTATABLE RETICLE

The invention relates to a viewing instrument for observing the surroundings and aiming at targets in the surroundings of a vehicle, in particular an armored vehicle, comprising an eyepiece unit and an objective unit and comprising an optical waveguide bundle, which connects the objective unit and the eyepiece unit to each other, wherein the optical waveguide bundle transmits an image of the surroundings, which is focused by the optical unit of the objective unit onto the objective-side end of the optical waveguide bundle, to the eyepiece unit.

Such a viewing instrument is disclosed by DE 102 53 477 A1. The viewing instrument enables a direct optical view, independent of electrical or electronic auxiliary means, and a positioning of the observer to the viewing instrument almost independent of the location of the objective unit of the viewing instrument. Thereby the user in the protected environment of a vehicle, in particular an armored vehicle, can observe the surroundings through the objective unit via the eyepiece unit. A disadvantage of the solution described here is that an inclined position of the objective unit is not corrected. Thus, coupling the objective unit to a weapon system as a target aid is possible only to a limited extent, since the inclined position of the vehicle and weapon system causes an error in the point of impact location.

EP 1 467 237 A1 and U.S. 2011/0271576 A1 disclose viewing instruments for observing the surroundings of a vehicle or for a handgun, which comprise an eyepiece unit, an objective unit and an optical waveguide bundle, wherein a reticle is arranged in front of the eyepiece unit.

Moreover, viewing instruments are disclosed by U.S. Pat. Nos. 5,103,713 A and 5,054,225 A, which comprise an eyepiece unit, an objective unit, an optical waveguide bundle and a reticle.

It is therefore an object of the invention to specify an improved viewing instrument which enables a simple correction of the inclined position, which is independent of electrical or electronic auxiliary means, in order to compensate for, or at least reduce, an error in the point of impact location caused by the inclined position of the objective unit.

Said object is achieved by a viewing instrument having the features of claim 1.

Because a reticle is arranged in an intermediate image plane, in which the optical unit of the eyepiece unit focuses the transmitted image of the surroundings as an intermediate image, and is rotatable about the optical axis relative to the intermediate image, the inclined position can be corrected in a simple way, which is independent of electrical or electronic auxiliary means, in order to compensate for an error in the point of impact location caused by the inclination of the objective unit. With the reticle that is rotatable relative to the intermediate image, the reticle can be corrected in an inclined position independently of electrical or electronic auxiliary means by simple, manual actuation. With the reticle that is rotatable with respect to the intermediate image, the point of impact location can be corrected in such a manner, in order to be able to aim at and neutralize enemy targets in the surroundings with a weapon system coupled to the viewing instrument even in the case of failure of the electrical system of an armored, armed vehicle. The reticle arranged in the intermediate image plane offers simple and robust support that is independent of electrical or electronic auxiliary means, in order to be able to reliably aim at targets in the surroundings even in the case of failure of the on-board electronics.

Advantageous embodiments and developments of the invention are evident from the dependent claims. It is to be pointed out that the features specified individually in the claims can also be combined with one another in any desired and technologically expedient manner and thus show further embodiments of the invention.

According to an advantageous embodiment of the invention, the optical axis is given by the eyepiece-sided exit axis of the optical waveguide bundle, wherein the reticle is rotatable relative to the optical waveguide bundle. With a rotation of the reticle in the eyepiece-sided exit axis relative to the optical waveguide bundle, a particularly simple construction of the viewing instrument is possible and the correction of the point of impact location can be carried out manually and intuitively by simply rotating the reticle.

Particularly preferred is an embodiment providing for the reticle to be rotatable relative to the optical waveguide bundle together with a first housing part of the eyepiece unit, in which the reticle is included for rotation therewith. With the inclusion of the reticle in the first housing part, the correction of the point of impact location can be carried out simply and intuitively by rotating the first housing part relative to the optical waveguide bundle.

A particularly advantageous embodiment of the invention relates to the fact that the eyepiece-side end of the optical waveguide bundle is non-rotatably arranged at a second housing part, wherein the first and the second housing part are connected to one another via a swivel joint. The rotation of the first and the second housing part of the eyepiece unit, via the swivel joint formed in the housing of the eyepiece unit, enables precise guiding of the reticle when correcting the inclined position in the objective unit.

A particularly advantageous embodiment of the invention provides for the second housing part to be fixed in the interior of the vehicle such that the first housing part is rotatable relative to the fixed, second housing part. By fixing the second housing part in the interior of the vehicle, an ergonomically optimized position of the eyepiece unit can be configured for the user of the viewing instrument in the interior of the vehicle. The fixing of the second housing part in the interior of the vehicle can also be designed to be optimizable for the needs of the user, and so the position of the eyepiece unit in the interior can be adapted to the size and posture of the user.

An advantageous embodiment of the invention provides a gravity sensor, which captures the alignment of the reticle relative to the horizontal. With such a gravity sensor, the reticle can be aligned with gravity, so that a simple correction of the point of impact location of a weapon system coupled to the objective unit is possible. With the alignment of the reticle relative to gravity, the horizontal of the surroundings can be displayed correctly even for an inclined position of the vehicle and weapon system by manually rotating the reticle without electrical or electronic auxiliary means.

Particularly advantageous is an embodiment providing for the gravity sensor to be arranged at the first housing part. With the coupling of the gravity sensor to the first housing part, this can be aligned with the reticle simply relative to gravity and thereby relative to the horizontal.

An advantageous embodiment provides for the gravity sensor to be designed as a spirit level, which is arranged at the first housing part and is visible from the outside. With a spirit level visible from the outside at the first housing part, the manual alignment of the reticle without electrical or electronic auxiliary means is possible in particularly simple and robust fashions.

Further features, details and advantages of the invention emerge from the following description and on the basis of the drawings, which show exemplary embodiments of the invention. Mutually corresponding items or elements are provided with the same reference signs in all of the figures. In the figures.

Figure 1:
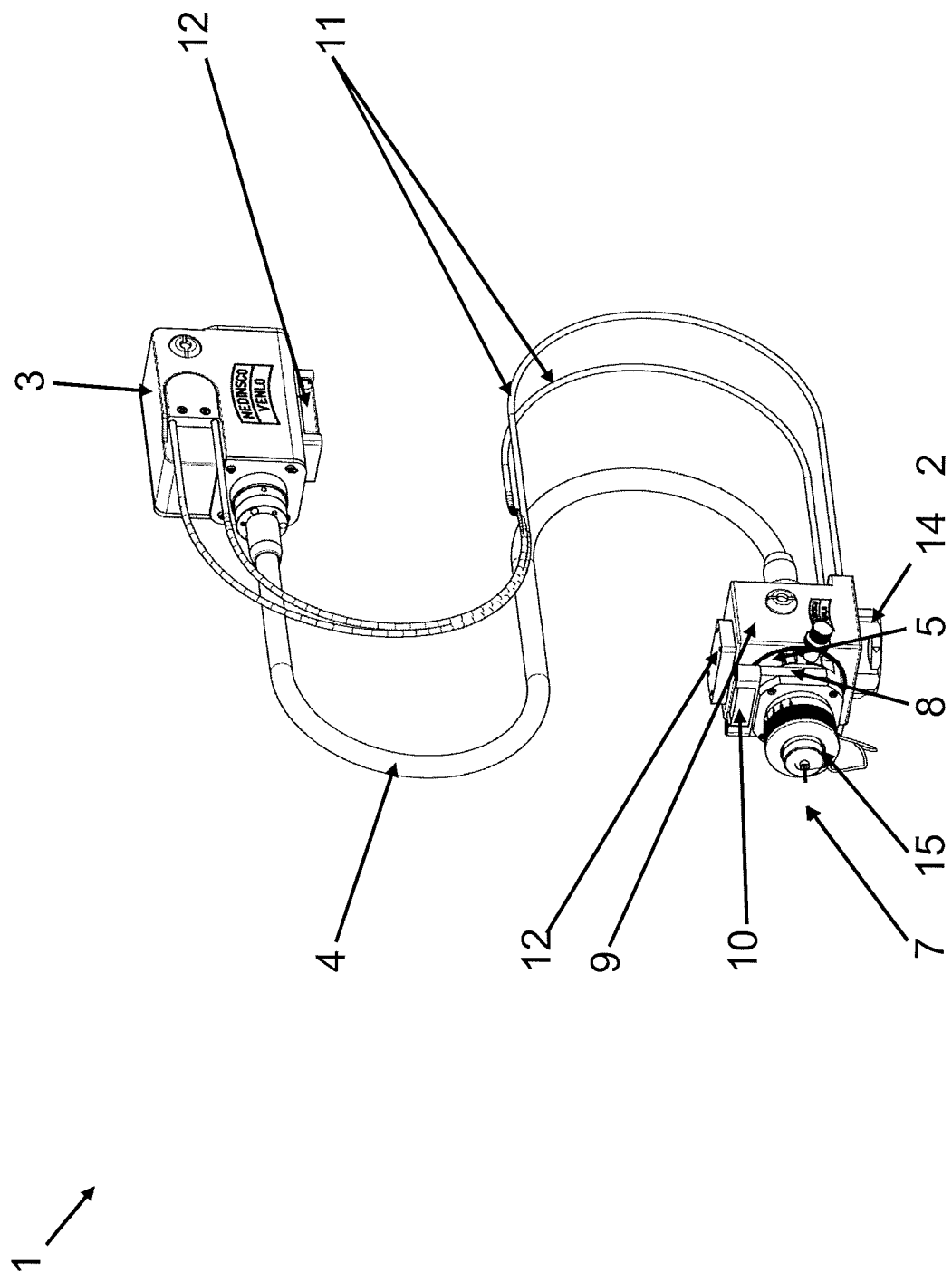
FIG. 1 shows a viewing instrument according to the invention.

In FIG. 1, a viewing instrument according to the invention is illustrated, indicated by reference sign 1. The viewing instrument 1 serves the observation of the surroundings and the aiming at targets in the surroundings of a vehicle, in particular an armored vehicle. For this purpose the viewing instrument 1 comprises an eyepiece unit 2 and an objective unit 3. While the eyepiece unit 2 can be arranged in the protected environment of a vehicle, in particular an armored vehicle such that the user of the viewing instrument 1 can thereby observe the surroundings around the armored vehicle from this protected environment, the objective unit 3 is arranged at an outer side of the vehicle, preferably coupled to a weapon system of the vehicle, in order to capture the surroundings. The eyepiece unit 2 and the objective unit 3 are connected by a flexible optical waveguide bundle 4, which transmits the field of view captured by the objective unit 3 to the eyepiece unit 2. Here, the optical waveguide bundle 4 transmits an image of the surroundings, which is focused by the optical unit of the objective unit 3 onto the objective-side end of the optical waveguide bundle 4, to the eyepiece unit 2. In addition the viewing instrument 1 comprises a drive device 11, with which a lens system of the objective unit 3 can be moved along an optical axis formed by the objective unit 3. Thus the lens system can be moved between two or more positions along the optical axis, wherein every one of the adoptable positions provides a different field of view setting. The drive device 11 comprises a flexible force transmission means, which connects the eyepiece unit 2 to the objective unit 3. Via this connection, a manual adjustment force, which the user exerts on the eyepiece unit 2, can be transmitted to the objective unit 3. In this way the field of view setting of the lens system in the objective unit 3 can be changed by the manual adjustment force. The force transmission means 11 is preferably designed for this purpose as a Bowden cable 11, which transmits the adjustment force as a tensile force. In this illustration it is evident that the manual adjustment force is introduced laterally via the force transmission means 11 into the objective unit 3. As is evident in FIG. 1, the Bowden pull 11 can preferably be designed as a double Bowden cable 11. The flexible embodiment of the Bowden cable 11 and optical waveguide bundle 4 enables a flexible arrangement of the eyepiece unit 2 and the objective unit 3, which are adjustable relative to one another. Thus the surroundings around the armored vehicle can be comprehensively observed with the viewing instrument 1 and targets in the surroundings can be precisely aimed at. For this purpose, the objective unit 3 can be coupled to an outer side of the vehicle, but in particular also to a weapon system. This is preferably done via the mount 12 arranged at the objective unit 3. The image of the surroundings, which is transmitted by the optical waveguide bundle 4, captured by the optical unit of the objective unit 3 and focused onto the objective-side end of the optical waveguide bundle 4, is superposed in an intermediate image plane, in which the optical unit 5 of the eyepiece unit 2 focuses the transmitted image of the surroundings as an intermediate image, with a reticle 6. For this purpose, the reticle 6 is arranged in the intermediate image plane. The reticle 6 is preferably printed on a glass pane which is arranged in the intermediate image plane. In order to compensate for an error caused by the inclined position of the objective unit 3 in the point of impact location of a weapon system coupled to the objective unit 3, the reticle 6 can be rotated manually relative to the intermediate image about the optical axis 7, which is given by the eyepiece-side exit axis of the optical waveguide bundle 4. Thus a correction of the point of impact location when the objective unit 3 is in an inclined position is possible, without the use of electrical or electronic auxiliary means. For this purpose, the reticle 6 is is rotatable relative to the optical waveguide bundle 4, which is connected to the eyepiece unit 2 by the eyepiece-side end.

Figure 2:
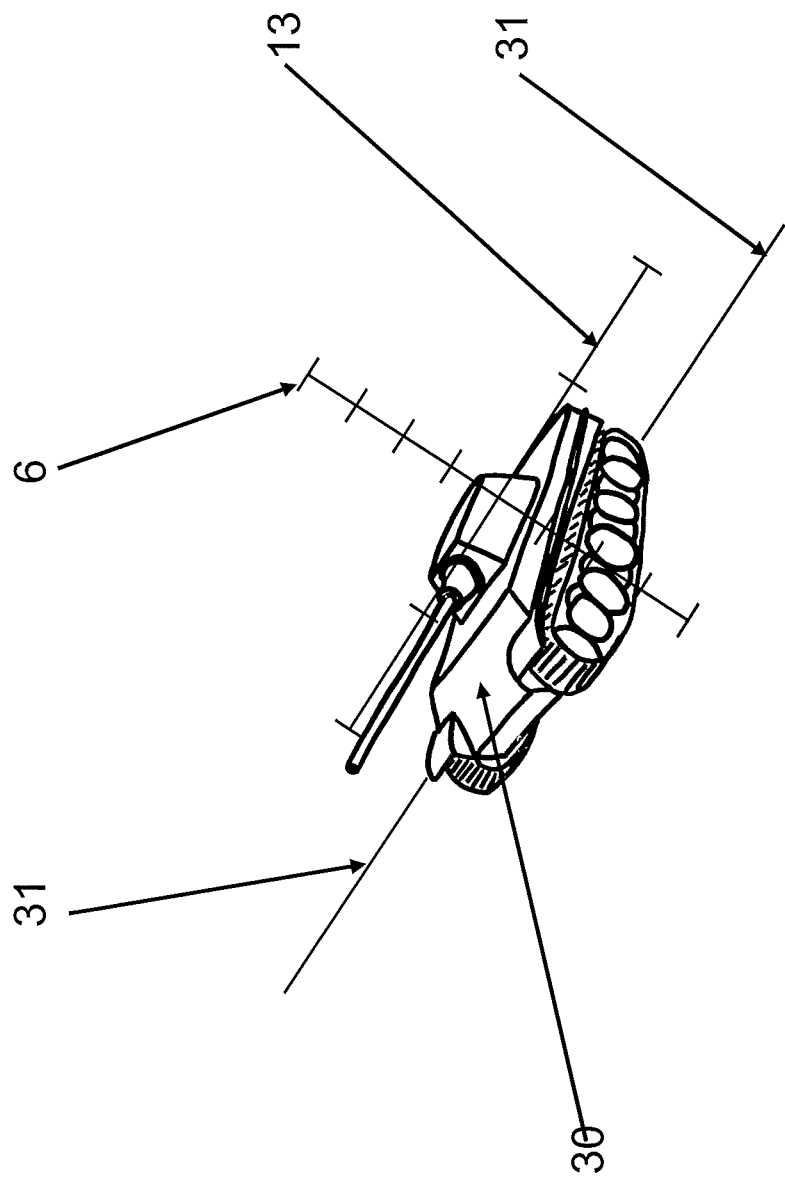
FIG. 2 shows a reticle in the inclined position of the objective unit without correction.

FIG. 2 shows, by way of example, an intermediate image which shows the surroundings captured by the objective unit 3. In these surroundings, an armored, armed vehicle 30 is shown, which is located on a mountain slope 31. The vehicle targeting vehicle 31 via the viewing instrument 1 is also in an inclined position, and so the horizontal line 13 of the reticle 6 is aligned on the mountain slope 31. The inclined position of the targeting vehicle also results in an inclined position of the objective unit 3, coupled to the vehicle or the weapon system, of the viewing instrument 1. Without correction, the inclined position of vehicle and weapon system causes an error in the point of impact location.

Figure 3:
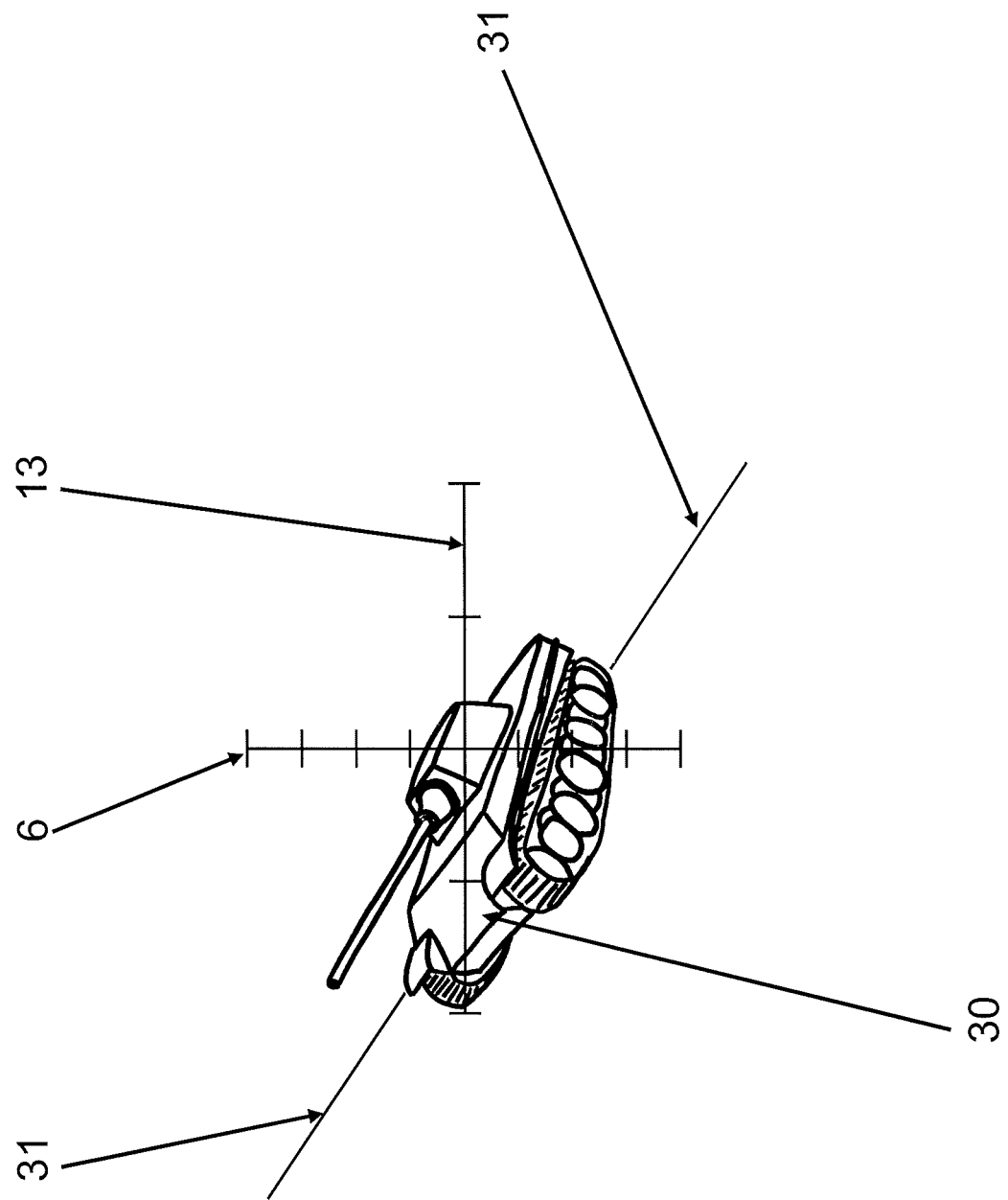
FIG. 3 shows the reticle in the inclined position of the objective unit with correction and FIG. 4 shows an eyepiece unit.

FIG. 3 shows, by way of example, an intermediate image which shows the surroundings according to FIG. 2 captured by the objective unit 3, wherein the reticle 6 here is rotated about the optical axis 7 relative to the intermediate image, in order to at least partially compensate for the error in the point of impact location of the coupled weapon system due to the inclined position of the objective unit 3. The horizontal line 13 of the reticle 6 is now horizontal here and thus aligned in the correct orientation in relation to gravity.

Figure 4:
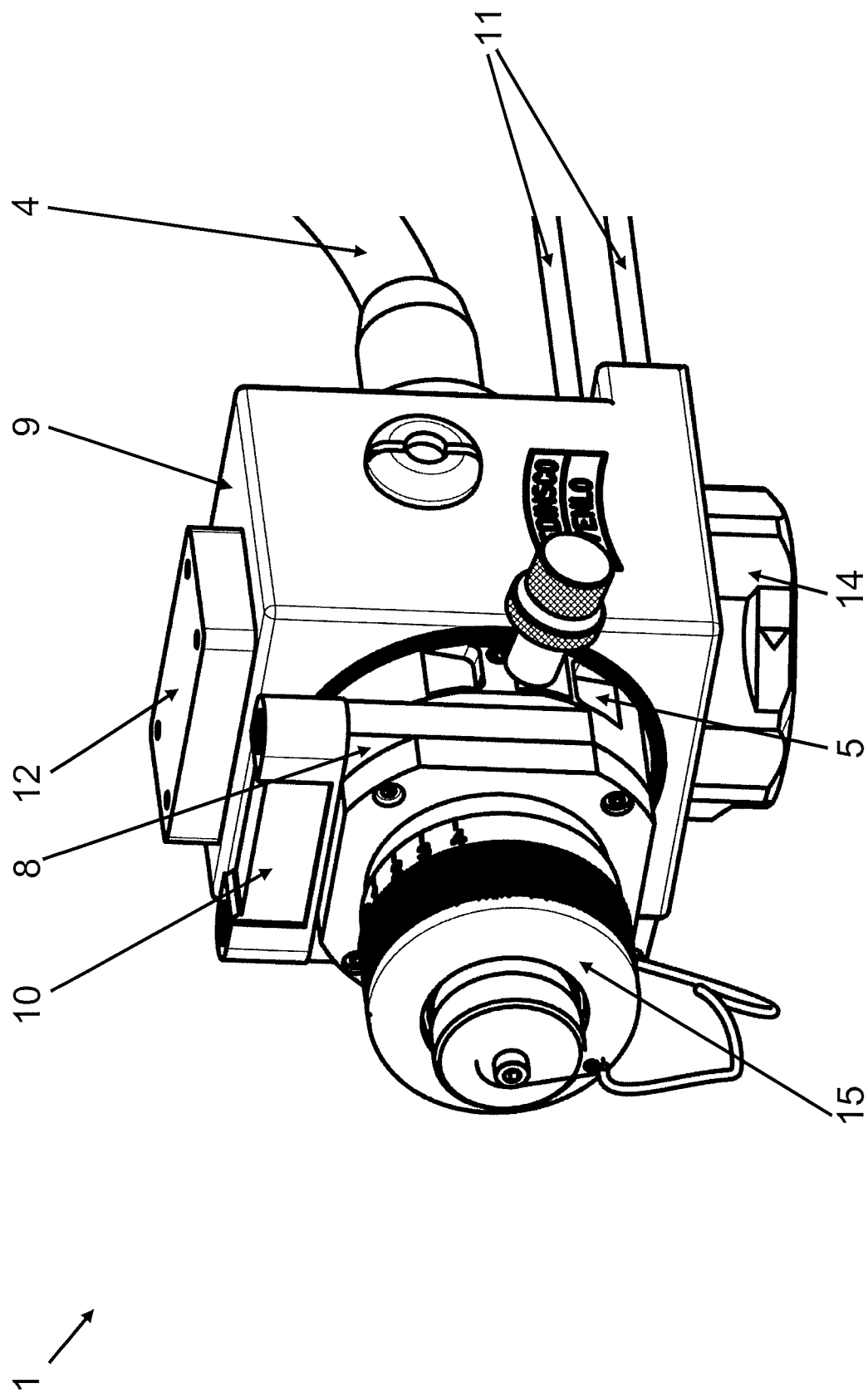

FIG. 4 discloses a detailed view of the eyepiece unit 2 according to FIG. 1. In this illustration the adjusting wheel 14 arranged on the eyepiece unit 2 is particularly evident, via which adjusting wheel the user can exert a manual adjustment force in order to move the lens system in the objective unit 3 along the optical axis and to select different field of view settings. For this purpose the adjusting wheel 14 is coupled to the force transmission means 11 and transmits the manual rotation of the adjusting wheel 14 to the objective unit 3 as a tensile force. The eyepiece unit 2 moreover has a dioptric setting 16, with which a setting of the optical power, dependent on the user, can be performed on the viewing instrument 1. In addition it is evident that the eyepiece unit 2 has a removable protective cap 15, by which the lenses of the eyepiece unit 2 are protected. A further function of the protective cap 15 is to prevent light from the inside being visible outside, externally to the vehicle. This means that the protective cap 15 is only then removed from the dioptric setting 16, when the viewing instrument 1 is used. For this purpose, the protective cap 15 can easily be positioned on and removed from the dioptric setting 16. In the embodiment shown here, the reticle 6 is connected to a first housing part 8 of the eyepiece unit 2 such that it is included in the first housing part 8 for rotation therewith. This first housing part 8 of the eyepiece unit 2 is rotatable relative to the optical waveguide bundle 4. The housing of the eyepiece unit 2 additionally comprises a second housing part 9, at which the optical waveguide bundle 4 is non-rotatably arranged. The first 8 and the second 9 housing part are connected to one another via a swivel joint, which enables the two housing parts 8, 9 to be rotated relative to one another. The second housing part 9 has a mount 12 at which the housing part 9 can be fixed in the interior of a vehicle. As a result, the first housing part 8 can simply be rotated relative to the fixed, second housing part 9. The alignment of the reticle 6 relative to the horizontal can be captured via a gravity sensor 10 which is arranged at the first housing part 8. The gravity sensor 10 is designed as a spirit level, which is arranged at the first housing part 8 and is visible from the outside. Via the spirit level 10, the horizontal line 13 of the reticle 6 can be horizontally aligned very simply and thus be aligned in the correct orientation in relation to gravity without electrical or electronic auxiliary means.

LIST OF REFERENCE SIGNS

1 Viewing instrument
2 Eyepiece unit
3 Objective unit
4 Optical waveguide bundle
5 Optical unit
6 Reticle
7 Optical axis
8 First housing part (eyepiece unit)
9 Second housing part (eyepiece unit)
10 Gravity sensor
11 Drive device
12 Mount
13 Horizontal line
14 Adjusting wheel
15 Protective cap
16 Dioptric setting
30 Vehicle
31 Mountain slope

The invention claimed is:

1. Viewing instrument for observing the surroundings and aiming at targets in the surroundings of a vehicle, in particular an armored vehicle, comprising an eyepiece unit and an objective unit and comprising an optical waveguide bundle, which connects the objective unit and the eyepiece unit to each other, wherein the optical waveguide bundle transmits an image of the surroundings, which is focused by the optical unit of the objective unit onto the objective-side end of the optical waveguide bundle, to the eyepiece unit, wherein a reticle is arranged in an intermediate image plane, in which the optical unit of the eyepiece unit focuses the transmitted image of the surroundings as an intermediate image, and is rotatable about the optical axis relative to the intermediate image.

2. Viewing instrument according to claim 1, wherein the optical axis is given by the eyepiece-side exit axis of the optical waveguide bundle, wherein the reticle is rotatable relative to the optical waveguide bundle.

3. Viewing instrument according to claim 1, wherein the reticle is rotatable relative to the optical waveguide bundle together with a first housing part of the eyepiece unit, in which the reticle is included for rotation therewith.

4. Viewing instrument according to claim 3, wherein the eyepiece-side end of the optical waveguide bundle is non-rotatably arranged at a second housing part, wherein the first and the second housing part are connected to one another via a swivel joint.

5. Viewing instrument according to claim 4, wherein the second housing part is fixed in the interior of the vehicle such that the first housing part is rotatable relative to the fixed, second housing part.

6. Viewing instrument according to claim 1, further comprising a gravity sensor, which captures the alignment of the reticle relative to the horizontal.

7. Viewing instrument according to claim 6, wherein the gravity sensor is arranged at the first housing part.

8. Viewing instrument according to claim 7, wherein the gravity sensor is designed as a spirit level, which is arranged at the first housing part and is visible from the outside.

* * * * *